J. N. THORNTON.
COMBINED ADDING AND TYPE WRITING MACHINE.
APPLICATION FILED MAR. 18, 1911.

1,058,810. Patented Apr. 15, 1913.
10 SHEETS—SHEET 1.

Fig. 1.

J. N. THORNTON.
COMBINED ADDING AND TYPE WRITING MACHINE.
APPLICATION FILED MAR. 18, 1911.

1,058,810.

Patented Apr. 15, 1913.
10 SHEETS—SHEET 9.

UNITED STATES PATENT OFFICE.

JOHN NEWTON THORNTON, OF BRIDGEPORT, CONNECTICUT, ASSIGNOR TO NEW YORK ADDING TYPEWRITER COMPANY, OF ORANGE, NEW JERSEY, A CORPORATION OF MISSOURI.

COMBINED ADDING AND TYPE-WRITING MACHINE.

1,058,810.  Specification of Letters Patent.  Patented Apr. 15, 1913.

Application filed March 18, 1911. Serial No. 615,395.

*To all whom it may concern:*

Be it known that I, JOHN NEWTON THORNTON, a citizen of the United States, and resident of Bridgeport, Fairfield county, State of Connecticut, have invented certain new and useful Improvements in Combined Adding and Type-Writing Machines, of which the following is a specification.

The present invention relates to improvements in combined adding and typewriting machines and has for its object to provide a machine of the character referred to in which the typewriting machine, as a complete unit, may be removed from or placed in position to actuate an adding mechanism, the platen carriage of the machine being adapted to be connected with a movable member of the adding mechanism so that said parts may travel together in the same direction throughout the entire movement of the platen carriage.

A further object of the invention is to provide a machine of the character referred to which shall be motor actuated and to simplify the parts by which the typewriting and adding mechanisms are interconnected with each other and with the power devices.

In the accompanying drawings.

Referring to the drawings, 1 designates a supporting frame, comprising a table like top and suitable legs or standards, which may be provided with casters or rollers so that the machine is readily moved from place to place. On said frame is mounted a typewriting machine including a movable platen carriage 2, a series of letter keys 3, a series of numeral keys 4, and type bars 5, each connected with one of said keys and bearing type corresponding to the letter or numeral on said key.

It will be evident that the invention is not limited to the use of any particular form of typewriting machine, but for purposes of illustration there has been selected a machine of the class shown in patent to E. B. Hess, No. 700,687, dated May 20, 1902, in which two links 6, 7, are interposed respectively between each key stem and the frame of the machine and between said key stem and the corresponding type bar. As shown the typewriting machine is supported on the top of the frame 1 by suitable feet 9.

The adding mechanism and actuating means therefor are arranged below the top of the stand or base 1 which top is apertured to permit the necessary movements of the connections between said actuating devices and the numeral type bars 5 and to expose to view the indicators of the adding mechanism.

Any desired number of accumulators or adders, three being shown, are mounted in a carriage 10 which is connected with the carriage 2 of the typewriting machine, so that both carriages move together and in the same direction. The accumulators may be of any suitable style and are adjustable longitudinally of a graduated rod 11 forming part of the auxiliary carriage, the graduations on said rod corresponding to those of the platen scale on the typewriting machine. The several trains of gears in each adder include pinions 12 which (see Figs. 2 and 11) project from the casing and are adapted to be actuated by a driving sector 13 when in alinement therewith.

Figure 3:
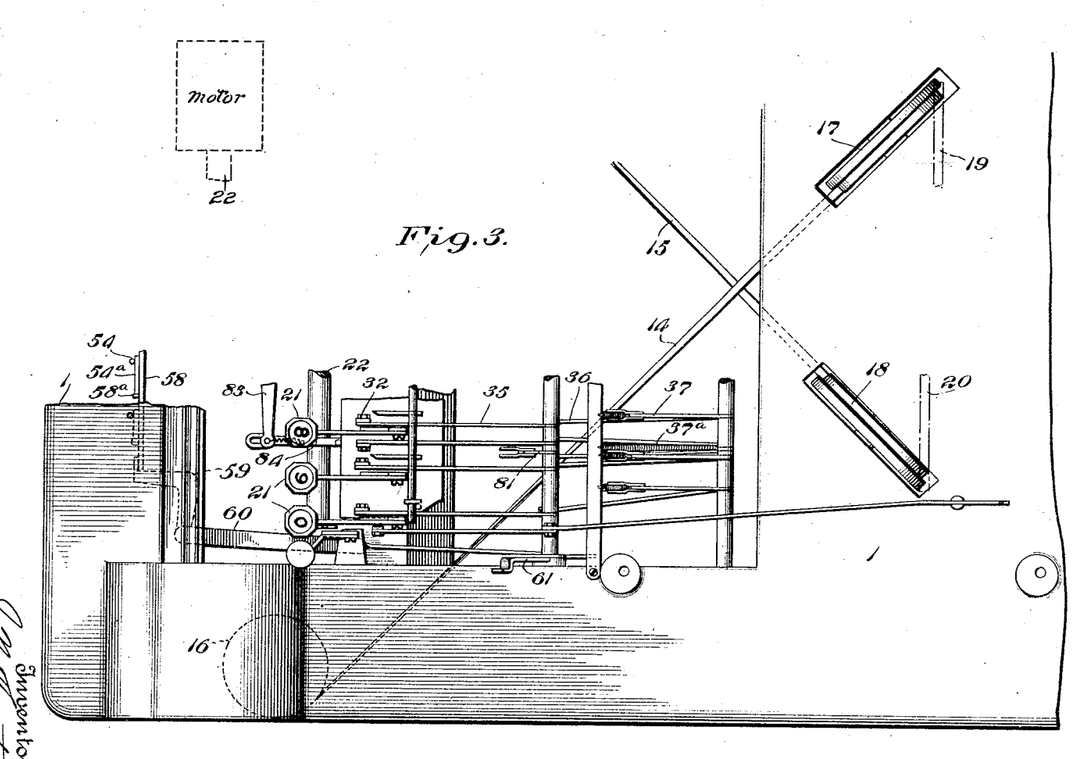
Fig. 3 is a plan view of a portion of the machine, the typewriting machine being removed.

To opposite ends of the carriage 10 bearing the adders are connected tapes or straps 14, 15 which after passing around suitable guide pulleys, one of which is indicated at 16, Fig. 3, are connected to drums 17, 18, mounted in suitable bearings attached to the top of the frame 1. Each of said drums 17, 18 is connected, as by tapes or straps 19, 20, with the platen carriage 2 of the typewriting machine. The drum 18 is provided with a propelling spring acting to constantly move both carriages from right to left. This drum therefore corresponds to the driving drum commonly provided on typewriting machines and which may be removed from the writing machine to which this invention is applied.

The drums 17, 18 each comprise two members or portions of different diameters to which the tapes, 14, 19 for example, from the adder and typewriter carriages are respectively connected. The difference in diameter of the members of each said drum is necessary to enable typewriters having carriage escapements of different pitches (that is which move different distances following the actuation of their keys) to be used in connection with an adder of a certain, definite pitch. In the form of the invention illustrated the "pitch" of the typewriter carriage is nine (9) while that of the adder is ten (10). Typewriting machines having a "pitch" as coarse as eight (8) and as fine as twelve (12) are in use. If the escapement of the two carriages have the same pitch the sections of the drum of course will not differ in diameter.

From the foregoing, it will be understood that the two carriages, that for the adders as well as the platen carriage, will be given a step by step movement to the left under the control of the usual typewriter escapement devices which are actuated whenever any key 3, 4, is operated or the space bar of the typewriting machine depressed.

The movements of the sector 13 are controlled by a series of keys 21 corresponding in number and order of arrangement to the numeral keys 4 of the typewriting machine, the keys 21 being positioned in advance of and below the keyboard of said machine.

While the keys 21 control the movements of the accumulator actuating sector, they are not directly connected with either said sector or with any part of the typewriting machine. Said keys are therefore herein termed "shifter keys" or "shifters" as their function is simply to shift or adjust parts in such manner that the sector 13 will receive the desired extent of movement, and the proper type bar 5 be operated, the power for effecting such movement and operation being furnished by a driving shaft 22.

Figures 9, 10:
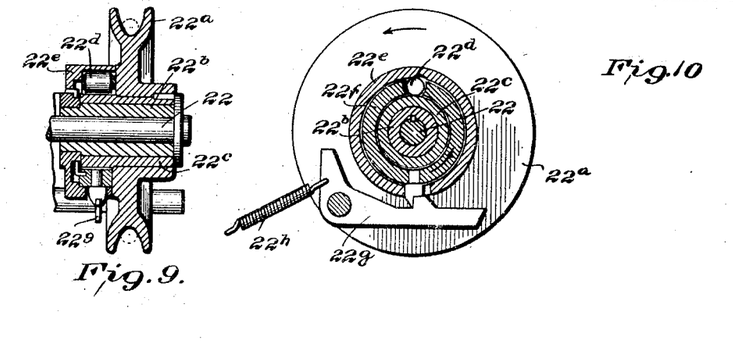
Figs. 9 and 10 illustrate in longitudinal and transverse section a clutch mechanism for connecting the main power shaft of the machine with a continuously running motor.

The shaft 22 is operated by a suitable motor, conventionally illustrated in dotted lines in Fig. 3, a clutch mechanism of the type commonly employed in machines of this character which permits said shaft to make a single revolution following the depression of any of the shifter keys 21, being interposed between the motor and shaft. In the drawings, Figs. 9 and 10, there is illustrated one form of such a clutch mechanism comprising a constantly rotating pulley 22$^a$ which is mounted to turn upon a sleeve 22$^b$ secured to the shaft 22. The pulley carries a hardened steel sleeve or bushing 22$^c$ which is loosely surrounded by a ring provided with a notch receiving a hardened cylinder or roller 22$^d$. The ring and roller are inclosed by a muff 22$^e$ which is suitably keyed to the shaft and a coiled spring is connected at one end to the muff and at the other to the ring 22$^f$. From the ring there projects a pin which extends through a slot in the muff and the coiled spring tends to turn the ring to move the pin thereon in the direction of the rotation of the shaft as indicated by the arrows in Fig. 10. The muff is provided with an inclined surface opposite the roller 22$^d$ and normally a detent 22$^g$ engages the aforesaid projecting pin shown in Fig. 10, holding the shaft stationary while the pulley 22$^a$ constantly rotates. When the detent 22$^g$ is depressed and the pin projecting from the ring 22$^f$ released, said ring is, by action of the coiled spring connected therewith, turned in the direction of the arrow, Fig. 10, and carries the roller 22$^d$ into engagement with the inclined face of the muff so that the latter is clutched to the sleeve 22$^c$, and therefore to the pulley 22$^a$ connected with said sleeve, and the muff and shaft connected thereto are compelled to turn with the pulley. Means to be hereinafter more particularly described are provided whereby when any shifter 21 is depressed and the parts are in proper position the detent 22$^g$ will be depressed and the shaft 22 connected with its driving wheel. Said detent 22$^g$ is carried to its normal position by a spring 22$^h$ shown in Fig. 10, after the pin connected with the ring 22$^f$ passes from contact therewith, and as a rotation is completed said pin again strikes the shoulder on the detent 22$^g$ and a slight rotation of the muff and shaft is permitted by the compression of the coiled spring which carries the inclined surface of the muff to a position to release the grip on roller 22$^d$ so that the pulley 22$^a$ can turn without moving the shaft 22.

Figure 2:
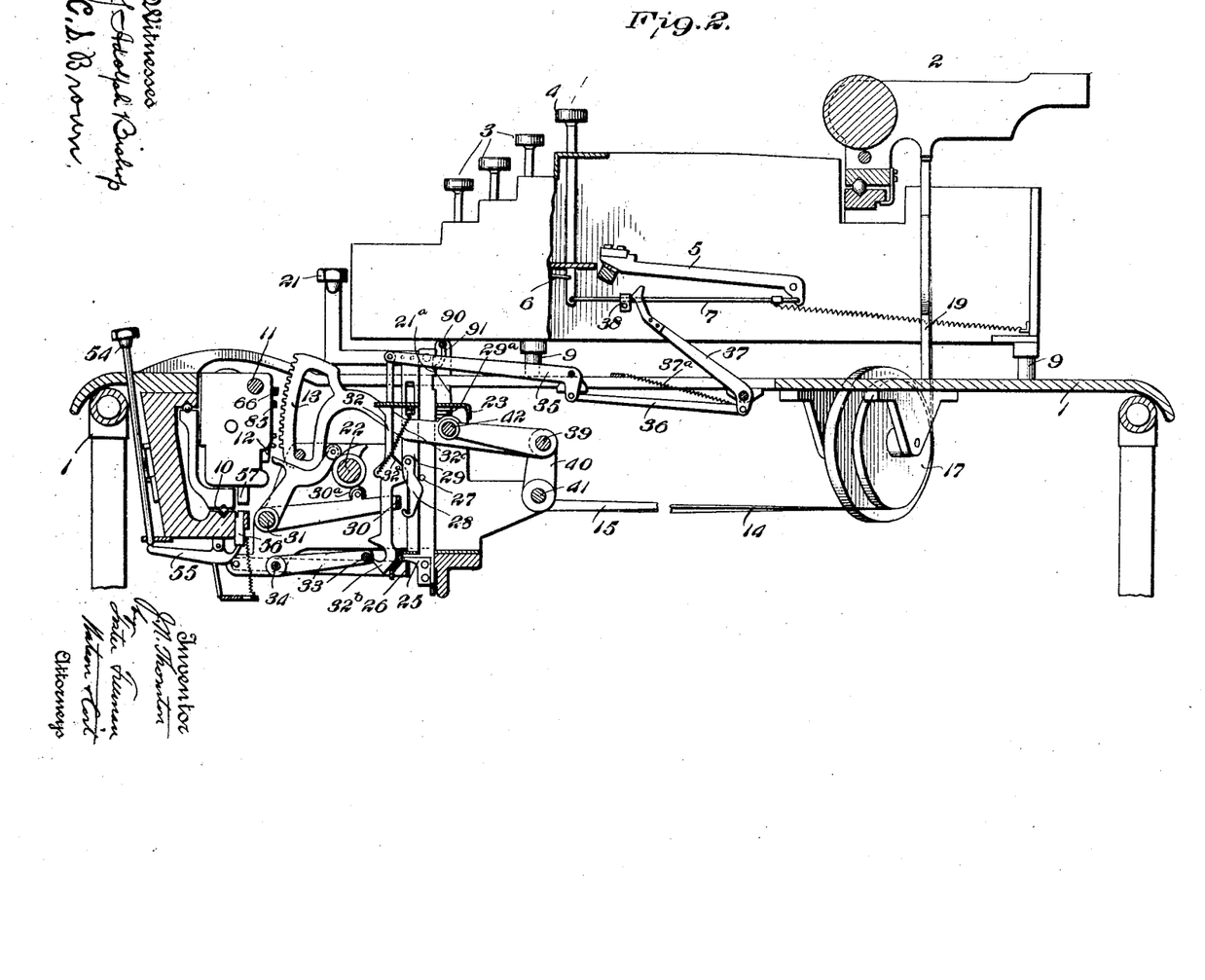
Fig. 2 is a longitudinal vertical sectional view through the machine, some of the parts being omitted and others illustrated more or less conventionally.
Figures 4, 5:
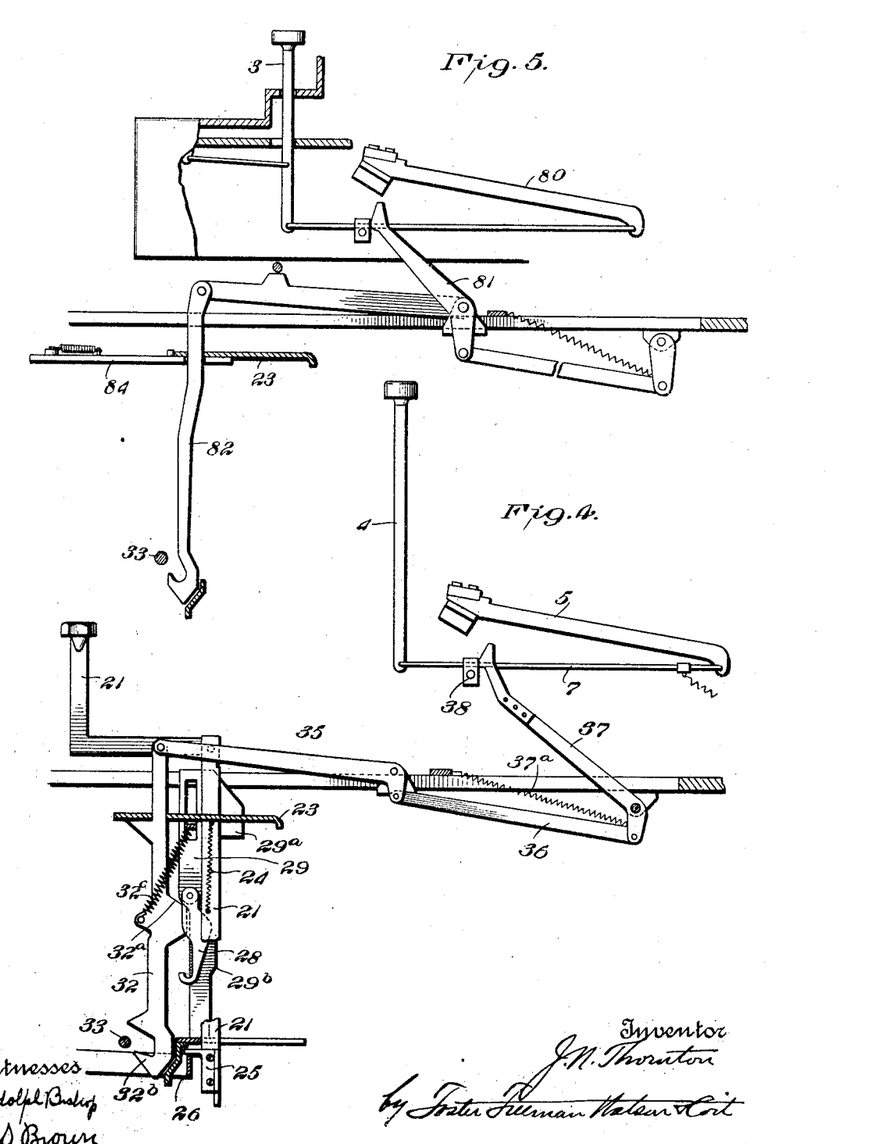
Fig. 4 is a detail view of one of the "shifters" and parts directly associated therewith, showing the connection between such parts and a numeral type bar of the typewriting machine.
Fig. 5 is a detail view of part of the means provided for automatically printing a decimal point.
Figure 11:
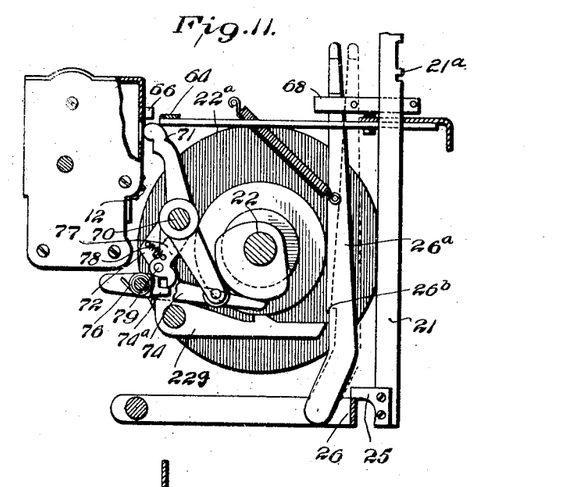
Figs. 11 and 12 illustrate in detail some of the means provided for automatically shifting the platen and adder carriages one space between the printing of numerals in, for example, the thousands and hundreds column.
Figure 12:
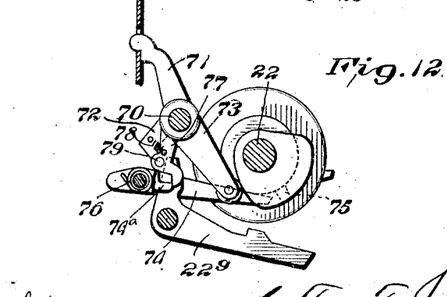

The stem or body of each shifter, as shown in Figs. 2, 4 and 11, extends through a slot in a supporting plate 23 and is normally held in an elevated position by the action of small coiled spring 24. At its lower end (see Figs. 2 and 11) said stem is provided with a lug or toe 25 which overhangs a member 26 of a bail that is adapted to actuate the aforesaid clutch mechanism, being provided with an upwardly extending arm 26$^a$ having a shoulder 26$^b$ above the clutch detent 22$^g$. Projecting laterally from the stem of each shifter is a stud 27 which as said shifter is depressed contacts with a hook 28, Figs. 2 and 4, mounted on a blade 29 at one side of the shifter and rocks the same into position to be engaged by a bail 30 supported to rock about a rod 31.

At each revolution of the power shaft 22 a cam 22$^a$ thereon (see Figs. 16 and 21) acts upon a roller 30$^a$ on the bail 30 to depress the bail and carry downward the blade 29 through the aforesaid engagement between said bail and the hook 28.

In its downward movement the blade 29, acting through a lateral projection, engages a cam surface 32$^a$ on a link 32, the lower end of which terminates in a hook 32$^b$, (Figs. 2 and 4) and moves said hook into engaging relation with a bail 33 which is mounted to swing about an axis 34. Said bail is rocked by the action of a cam 33$^a$ (Figs. 16 and 18) on the shaft 22 coöperating with a link 33$^b$ rising from the bail. The upper end of link 32 is, as shown in Figs. 2 and 4, connected to one arm of a bell crank lever 35, the other arm of which is connected, by a link 36, with a lever arm 37, the upper end of which is forked to receive the member 7 of one of the connections between the numeral key 4 of the typewriting machine and its associated type bar. An abutment or stop 38 is secured on the member 7 of the typewriter key action in such position as to be engaged by the forward face of the upper portion of the arm 37. Springs 32$^c$ and 37$^a$ act to hold the link 32 in its elevated position and to assist in restoring the arm 37 to normal position after it has been operated.

Figure 6:
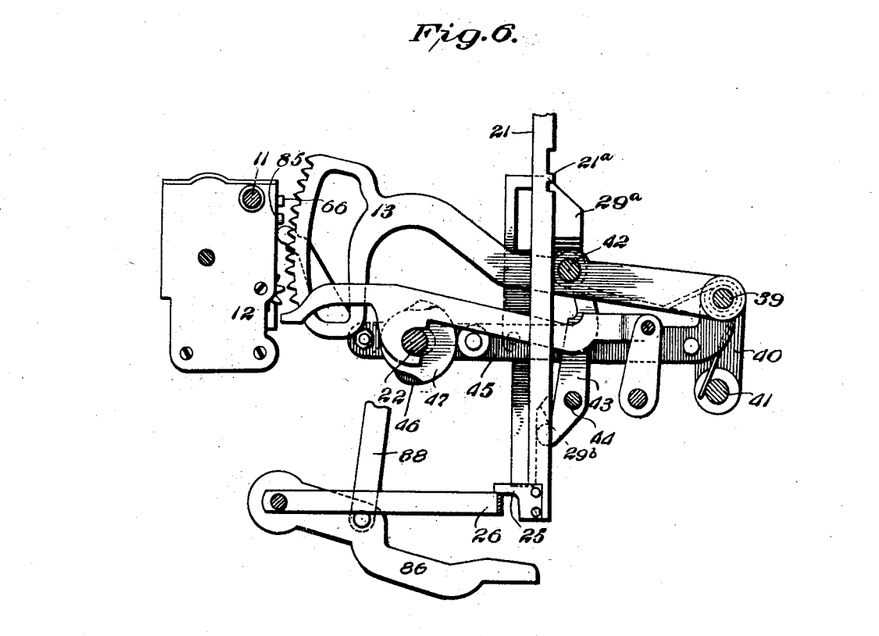
Figs. 6, 7 and 8 illustrate in detail the actuating sector of the adder mechanism and means for shifting it to and from engagement with an adder.

It will thus be seen that the depression of any shifter 21 results in a rotation of the power shaft 22 and an operation of the numeral type bar 5 corresponding to the depressed shifter. The depression of any shifter also as hereinafter described results in effecting an engagement of the sector 13 with the pinion 12 of the adder which is in alinement therewith and a movement of said sector and pinion sufficient to accumulate in the adder the value represented by the depressed shifter. Said sector 13 is, as shown in Figs. 2 and 6, supported by a frame adapted to rock about a rod 39 constituting one member of a frame which is supported by links 40 pivotally mounted to vibrate about an axis 41. Another member 42 of the sector supporting frame extends past the series of shifters and blades 29 being below a rearwardly projecting section 29$^a$ of each blade. Therefore the downward movement of any blade 29 will produce a similar movement of the sector 13. The extent or amount of downward movement of the sector resulting from the depression of any shifter 21 depends upon the location of the section 29$^a$ on the blade 29. As shown said sections, or the lower edges thereof, are situated at different distances from the ends of the blades 29 which are all of the same length and adapted to move uniform distances. To positively limit the downward movement of the sector a series of stops 43 (see Fig. 6) graduated in length and arranged to be positioned in the path of the rod 42 of the sector supporting frame are employed. Said stops are pivotally mounted on a rod 44 and the lower end of each normally projects into the path of a cam edge 29$^b$ on one of the blades 29, so that the downward movement of any of said blades acts to positively rock the associated stop 43 into position to properly limit the downward movement of the sector.

Figures 7, 8:
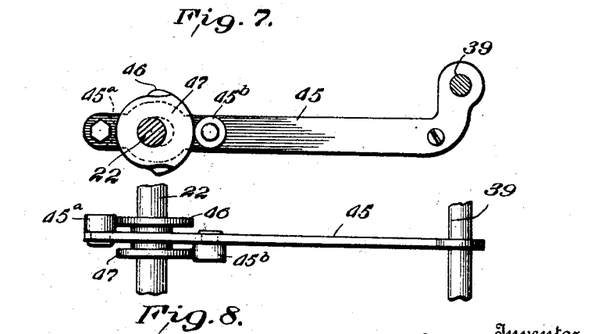

Normally the sector is retracted from the position where it can actuate a pinion 12 and means are provided whereby at each revolution of the power shaft 22 the links 40 supporting the sector frame are rocked to move the sector into engagement with the alined pinion and return it to normal position. Said means comprise an arm 45 that is supported at its rear end by the rod 39 of the sector supporting frame and extends forwardly therefrom. The shaft 22 extends through a suitable slot formed in the arm 45 and two cams 46, 47, thereon are adapted, respectively, to contact with rolls 45$^a$, 45$^b$, mounted on the arm, as shown in Figs. 6 to 8. The cams 46, 47 are so formed and related that following the depression of any shifter, the sector is first moved forward into engagement with a pinion 12, then downward a distance corresponding to the numeral appearing on the shifter, and then withdrawn from engagement with the adder and restored to its normal elevated position.

Figures 13, 14:
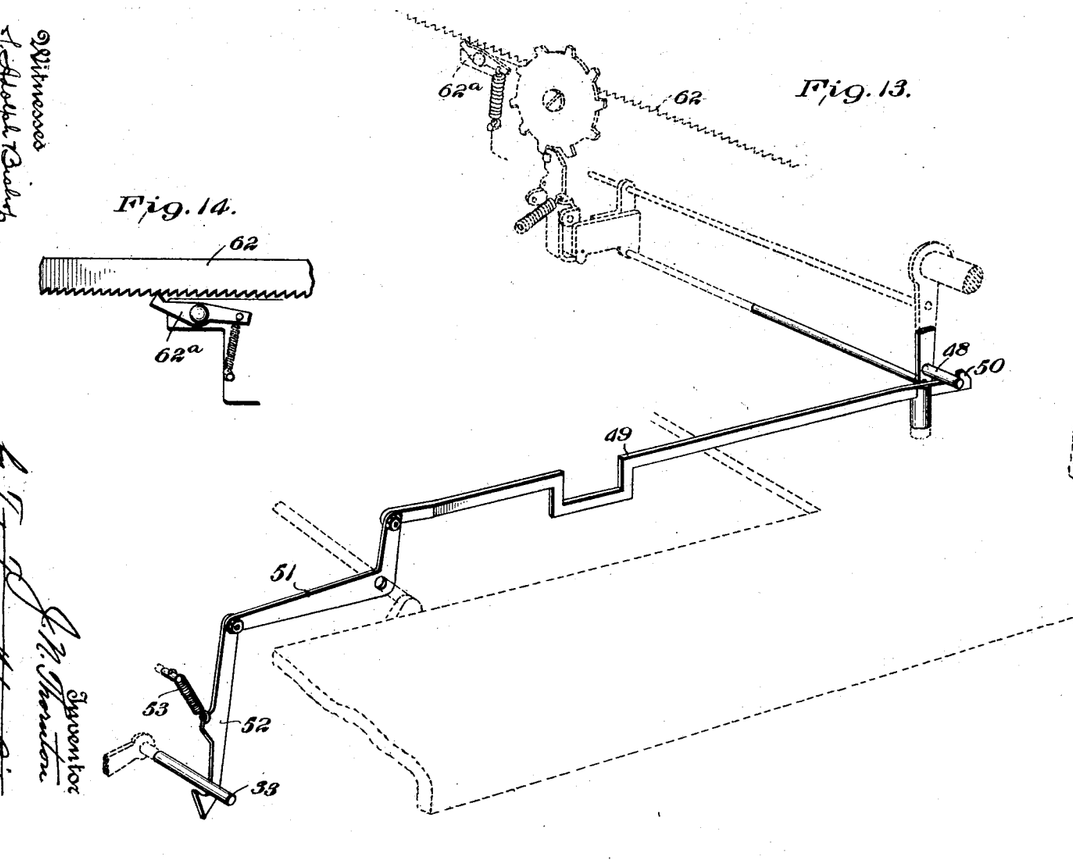
Fig. 13 illustrates the connection between the motor actuated parts and the escapement devices of the typewriting machine.
Fig. 14 is a detail view of a portion of the typewriter feed rack and a coöperating locking dog.

When any of the shifters is depressed it is employed for actuating the escapement devices on the typewriter by which letter space movements of both the platen carriage 2 and auxiliary adder carriage 10 are controlled. For this purpose, there is provided a connection between said bail and the universal bar devices of the typewriting machine. In the particular form of typewriting machine that has been selected for purposes of illustration, the dog carrying rocker of the escapement is, as shown in Fig. 13, carried by a bail adapted to be rocked by the depression of any key 3, 4, and this bail is provided at its ends with laterally projecting pins or studs 48 to which the space bar of the typewriting machine is connected. A link 49 having at its rear end a hook 50 adapted to engage one of said studs 48 is connected with one arm of a bell crank 51 fulcrumed on the same axis as the levers 35 and from the forward end of said bell crank depends a hook 52 which is held normally beneath the rear member of the bail 33 by the action of a spring 53.

Any desired number of accumulators may be provided on the auxiliary carriage, each being adjustable on the supporting rod 11 to properly position it with respect to the platen scale on the typewriting machine and by manipulation of the space bar or operation of the keys 3, 4, of the typewriting machine the proper pinion of any of the adders can be brought into alinement with the sector 13.

Figure 15:
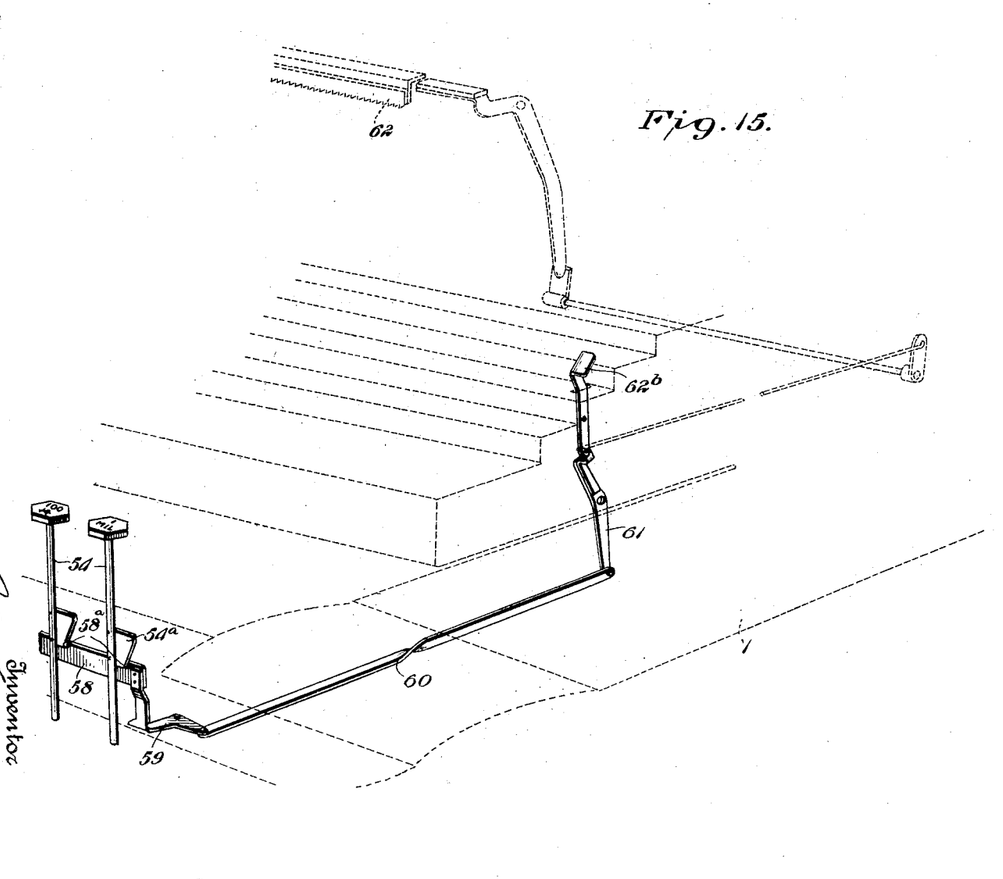
Fig. 15 illustrates the connection between the tabulator keys at the front of the machine and the typewriter feed mechanism.

As both carriages 2, 10 are driven by a single spring drum and the connections between the carriages and drums are liable to vibrate slightly at the termination of each feeding movement, there is provided a supplemental dog 62$^a$ (Figs. 13 and 14) adapted to engage the platen carriage feed rack 62 with sufficient force to prevent said carriage from rebounding. The embodiment of the invention selected for purpose of illustration also includes a decimal tabulator mechanism comprising a series of stops, actuated by depressing keys 54, shown in Figs. 1, 2, 3 and 15, and arranged to coöperate with a stop on the casing or frame of each adder. As shown the tabulator keys are supported near the forward edge of the base or stand 1 and the stem of each bears directly on one arm of a lever 55, the other arm of which extends beneath a vertically movable stop 56 adapted, by the rocking of said lever, to be projected into the path of a depending stop 57 on each adder casing. The stem of each tabulator key is provided with a cam shaped projection 54$^a$ (Figs. 3 and 15) which is adapted to engage a pin 58$^a$ on a slide 58, and move said slide longitudinally when the key is depressed. The same extent of movement is imparted to the slide 58 by each tabulator key and said slide bears against one arm of a bell crank 59. The other arm of this bell crank is connected by a link 60 to a lever 61, which is positioned to engage the "release lever" 62$^b$ of the typewriting machine. This latter lever is connected with the feed rack 62 of the typewriting machine in the ordinary manner so that whenever the lever 62$^b$ or any of the tabulator keys 54, is actuated, the feed rack will be disengaged from the escapement controlled pinion and both the platen and adder carriage will travel rapidly to the left, under the influence of the spring drum 18 until arrested by the stop 56 positioned by the depressed tabulator key striking the adder stop 57 or by the proper stop on the typewriter frame if the typewriting machine is being used alone.

From the foregoing it will be seen that by the manipulation of the keys of the typewriting machine, the platen and adder carriages will be given a step by step movement and when a pinion 12 of one of the adders is in alinement with the sector 13, the depression of any shifter 21 will effect an actuation of such pinion corresponding with the indication on the head of the depressed shifter and an operation of the corresponding numeral type of the typewriting machine. Means are provided whereby it is impossible to depress a shifter and effect a connection of the motor and main power shaft 22, except when one of the adders is in position to be actuated by the sector 13. These means include a horizontal lever 64 fulcrumed on a supporting arm 65 and having one end coöperating with a notched bar or plate 66 secured to the face of each adder. The other arm of the lever 64 is connected as indicated in dotted lines in Fig. 1, with the clutch tripping member 26$^a$ of the bail 26. A spring 67 acts constantly to hold the lever 64 in such position that the arm 26$^a$ will be maintained in the position shown in dotted lines in Figs. 1 and 11, at which time downward movement of said arm is prevented by a stop 68. When, however, the opposite end of the lever 64 bears upon the face of one of the plates 66, the clutch releasing arm 26$^a$ is drawn forward into the position shown in full lines in Figs. 1 and 11, at which time its shoulder 26$^b$ is above the end of the latch 22$^g$, and therefore adapted to effect an engagement of the motor and main shaft when any one of the shifters 21 is depressed. Each plate 66 is provided with a plurality of notches corresponding to the spaces separating the groups of indicating disks or wheels of the adder so that when one of said spaces is in alinement with the sector 13, the shifters are locked through the above described action of the spring 67, said notches being of such depth as to permit a sufficient rocking of the lever 64 to accomplish this purpose.

Means are also provided whereby when the machine has been operated to actuate the pinion 12 of the lowest order represented in any section of an adder, the power shaft 22 will be caused to make two complete revolutions and thereby move the platen and adder carriages an additional step, corresponding to the distance between the sections of the adder and represented by each of the notches in the plate 66. These means are illustrated particularly in Figs. 11, 12, 16 and 17. A rock shaft 70 suitably mounted in the supporting base or stand is provided with three arms 71, 72 and 73, the former being adapted to bear on the surface of the adder case which is provided with slots corresponding in position to the notches in the plate 66, and the aforesaid spaces between the divisions of the adder. With the shaft 70 is connected a suitable spring acting to carry the arm 71 toward the adder case and into the slots therein. The arm 73 extends into the path of a cam 73$^a$ on the main shaft 22, which rocks the shaft 70 just before the feeding of the carriages occurs. A catch lever 74 is positioned below the shaft 22 and a lug 75 rotating with said shaft is adapted to engage and depress said catch lever.

A coiled spring 76 operates to hold the catch lever in the path of lug 75 but normally, and while the arm 71 is bearing against the surface of the adder case, said catch lever is held in the depressed position shown in Fig. 11 by the action of a latch 77 coöperating with a shoulder 74$^a$ on the lever. The latch 77 is mounted to swing on shaft 70 and is connected by a spring 78 with the arm 72 to which is attached a pin adapted to move said latch from the position shown in Fig. 11 to that represented in Fig. 12. The latch 77 is provided with a pin 79 adapted, as said latch is rocked by the arm 72, to coöperate with the detent 22$^g$ and shift it into the position shown in Fig. 12 where it will not act to check rotation of the shaft 22.

From the foregoing it will be seen that while the arm 71 is bearing against the adder case the latch 77 will hold the lever 74 depressed and will itself be out of engagement with the detent 22$^g$ which will therefore stop the shaft 22 on the completion of each rotation. If however, after a shifter has been depressed, the next feed movement of the carriage brings a slot in the adder case opposite the end of lever 71 the latter will swing into the position shown in Fig. 12 as the cam 73$^a$ is carried away from the arm 73. Such movement of the arms 71, 72 and 73, acts to move the latch 77 away from shoulder 74$^a$ and permit the catch lever 74 to rise, under the action of spring 76, into the path of the lug 75. Further such movement causes the pin 79 to become operative to hold the detent 22$^g$ in the position shown in Fig. 12. Therefore the shaft 22 is not stopped by said detent as it completes a rotation and as the second revolution thereof progresses the cam 73$^a$ will rock the arms 71, 72 and 73 to withdraw the arm 71 from the slot in the case. The latch 77 will however remain in the position shown in Fig. 12 (the spring 78 being stretched by the movement of arm 72 away from said latch) until the catch lever 74 is depressed by the lug 75. This releases the detent 22$^g$ and permits it to stop the shaft on the completion of the second rotation thereof.

Figure 1:
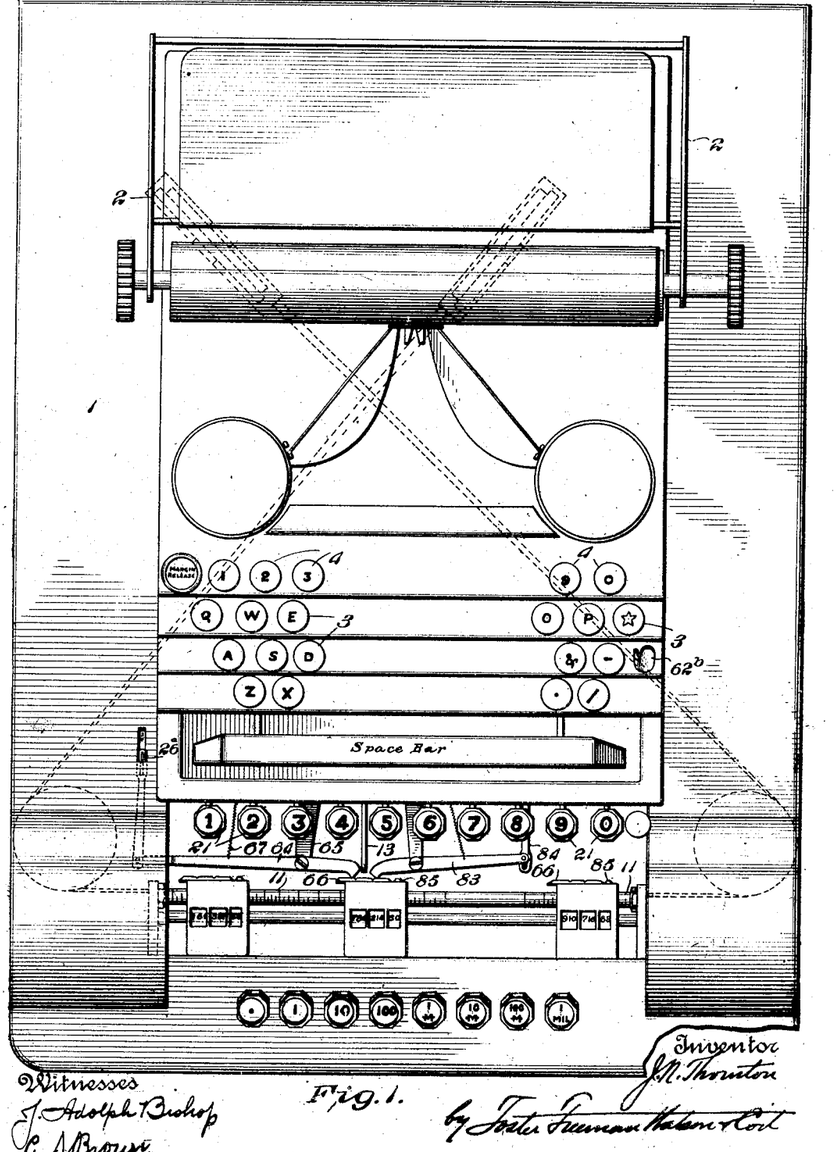
—Figure 1 is a plan view of a combined adding and typewriting machine constructed in accordance with the invention.
Figures 16, 17, 18, 19, 20, 21:
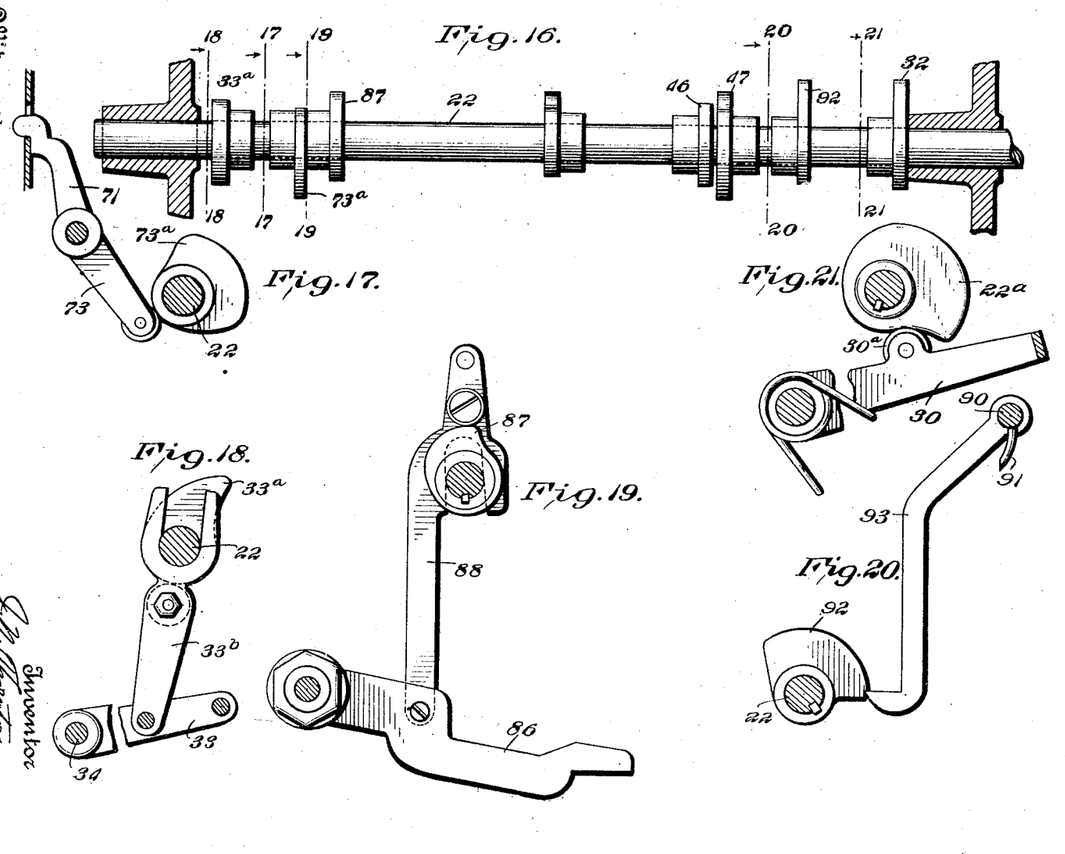
Fig. 16 is a detail of the main power shaft of the machine.
Figs. 17 to 21 inclusive are sectional views taken on the several lines indicated on Fig. 16.

When the carriages have been moved to such an extent that the last figure printed is in the dollars column, it is necessary to print a period or decimal point before printing a figure in the succeeding, cents, column. In effecting this operation, the parts last described operate as above set forth to cause a second rotation of the shaft 22 and feed the carriages one step, and in connection therewith operate the type bar 80 carrying the period or decimal point. Said type bar is connected with a key 3 of the typewriting machine in the usual manner and is also adapted to be operated by a lever 81 similar in form to the levers 37, which lever 81 is connected with a hook 82 which is automatically moved to a position to be engaged by the bail 33 when the adder is in such relation to the sector 13 that the printing of a decimal point is required. The means for thus shifting the hook 82 include a lever 83 somewhat similar in form to but, as shown in Fig. 1, extending in the opposite direction from the lever 64 and in a plane below said lever 64. This lever 83 is connected at one end with the hook 82, as by a link 84, and its opposite end extends in the path of a lug 85 on the adder case, said lug being so positioned that it will rock the lever into position to bring the hook 82 below the bail 33 prior to the second rotation of the main shaft 22, resulting as aforesaid when the last operation has been that incident to printing a figure in the units column and actuating the pinion 12 of the corresponding adder section. During any such second rotation of the main shaft 22, it is of course desirable that the shifters 21 be maintained in their normal elevated positions, because if a shifter were depressed immediately following the first rotation of the power shaft, the result would be the printing of a figure where it is desired there should be a blank space. Therefore, means are provided whereby even if an operator fails to remove his finger from a shifter in proper time, such shifter will be positively lifted and the undesirable printing avoided. This lifting of any depressed shifter sufficient to prevent engagement of the power devices with the printing means is accomplished by a pivotally mounted arm 86, the free end of which (see Fig. 6) extends beneath the cross bar of the bail 26, and is positively moved upward at each rotation of the power shaft 22 by the action of a cam 87 coöperating with a link 88 attached to said arm 86, as shown in Fig. 19. It is also important that when any shifter is depressed it be held in its lowered position for a sufficient length of time to insure the proper engagement between the members 28, 30, 32$^b$ and 33. This is accomplished by providing the stem of each shifter with a shoulder 21$^a$ (Figs. 2 and 6) adapted to be engaged by one of a series of fingers 91 (Figs. 2 and 20) carried by a rock shaft 90 that extends past all of the shifters and is moved by a suitable spring to carry said fingers toward the shifters. Such swinging movement of the fingers 91 is limited by a cam 92 on the shaft 22 which engages an arm 93 depending from the shaft 90, and passes from engagement with said arm just after the main power shaft 22 begins a rotation. As the cam 92 moves from the arm 93, the shaft 90 is rocked by its spring to carry the fingers 91 toward the shifters and the finger 91 in alinement with the depressed shifter will come into a position above the shoulder 21$^a$ thereon, and hold the shifter down while the other fingers 91 will extend into suitable recesses formed in the shifter stems.

From the foregoing description and drawings, it will be seen that the present invention provides a very compact arrangement of parts and that the action of the typewriting machine is not interfered with in the slightest degree. All of the parts of the adding mechanism, including the shifters, are arranged in advance of and below the typewriting machine so that the operator's view of the platen, key board, etc., of the latter machine, is not obstructed at all. By this arrangement also the adders are brought very close to the front of the base or stand of the machine and so that they can be readily read or adjusted by the operator. Further it will be noticed that the key board of the typewriting machine is arranged in such relation to the forward edge of the supporting stand or base that it is as readily accessible as the key board of such a machine when mounted on a stand or desk of the character commonly employed. An important feature of the invention also is the fact that the platen and adder carriages are so connected that they move together and in the same direction under the control of the escapement devices of the typewriting machine. In the accompanying drawings the said carriages are shown as connected by tapes but it will be readily understood that they may be connected by cables or any practical form of gearing. One such form of gearing connection is shown in Fig. 22.

Figure 22:
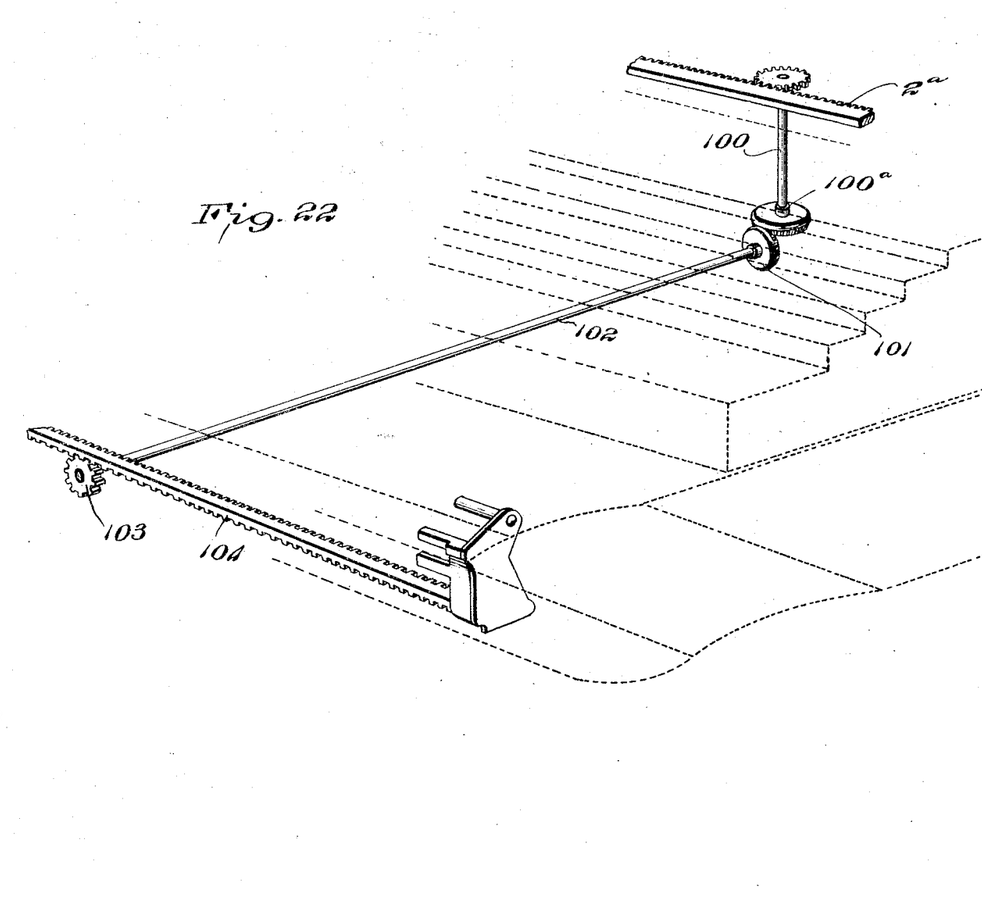
Fig. 22 illustrates a different form of connection between the typewriting and adding carriages.

Referring to Fig. 22, which illustrates a direct, rigid, connection between the two carriages it will be seen that the platen carriage is provided with an additional or supplemental rack 2$^a$ with which engages a suitable pinion at the upper end of a vertical shaft 100 mounted in bearings on the base or stand and provided at its lower end with a bevel gear 100$^a$. With this latter gear meshes a bevel pinion 101 on a shaft 102 mounted in bearings beneath the top of the base or stand and extending forward thereunder, near the left hand side of the machine, Fig. 1. At its forward end the shaft 102 carries a pinion 103 which engages a rack 104 on the adder carriage. This arrangement it will be seen provides a direct driving connection between the two carriages, the usual spring drum of the typewriting machine being employed to furnish the power for moving both carriages to the left.

Many of the means herein illustrated and described are disclosed in patent to F. A. Hart No. 961,073 dated June 7, 1910, the machine of this application being an improvement upon that of this Hart patent. Among the important differences between the present invention and the mechanism of said patent are to be noted that by the latter the adder is carried by the same carriage upon which the platen of the typewriting devices is supported. The machine of the patent to Hart referred to is an "adding typewriter", whereas the present invention provides a means by which a typewriting machine complete in itself may be associated with an adding mechanism, but is not necessarily included in the same frame-work or casing as the adding mechanism. It will be seen that the typewriter herein illustrated and described can be bodily removed from the base or stand when desired without disengaging the adding mechanism from its support.

Having thus described the invention, what is claimed is:

1. In a combined adder and typewriter, the combination of a suitable stand or base, a typewriting machine mounted on the stand and comprising a platen, a carriage therefor, printing devices adapted to coöperate with the platen, and keys for actuating the printing devices, all of said parts being simultaneously removable as an entirety from the stand, a carriage supported by the stand independently of and in front of and below the typewriting machine, means for causing said carriage to move in the same direction and in unison with the platen carriage of the typewriting machine, an adder mounted in said forward carriage, a motor, and a series of shifter keys supported by the stand in front of the typewriting machine and corresponding in number to the numeral keys of said machine, each of said shifter keys being adapted to effect an actuation by the motor of the adder and the corresponding numeral type of the typewriting machine.

2. In a combined adder and typewriter, the combination of a suitable stand or base, a typewriting machine mounted on the stand and comprising a platen, a carriage therefor, printing devices adapted to coöperate with the platen, and keys for actuating the printing devices, all of said parts being simultaneously removable as an entirety from the stand, a carriage supported by the stand to travel beneath a slot in the top of the stand in front of the typewriting machine, an adder mounted in said carriage and visible through said slot, means connecting the adder carriage with the platen carriage of the typewriting machine to cause the two carriages to move together and in the same direction, a motor, and a series of shifter keys supported by the stand in front of the typewriting machine and corresponding in number to the numeral keys of said machine, each shifter key being adapted to effect an actuation by the motor of the adder and the corresponding numeral type of the typewriting machine.

3. In a combined adder and typewriter, the combination of a suitable stand or base, a typewriting machine removably mounted on said base and provided with a platen carriage and escapement devices controlling step by step movement of such carriage, a carriage mounted to travel beneath the top of the base in front of the typewriting machine, an adder supported by said carriage, means connecting the adder carriage with the platen carriage of the typewriting machine so that said carriages are both controlled by the escapement devices of the typewriter, a motor, means mounted on the stand or base and adapted to be actuated by the motor for operating the adder, supplemental means on the stand or base adapted to be actuated by the motor to operate the numeral type of the typewriting machine, said means permitting the typewriting machine to be removed at will, and a series of shifters mounted in the stand or base in front of the typewriting machine and corresponding in number to the numeral keys of the typewriting machine, each of said shifters being adapted to effect a connection between the motor and adder actuating means and between the motor and said supplemental means for operating the numeral type of the typewriting machine.

4. In a combined adder and typewriter, the combination of a suitable base or stand, an adding mechanism supported thereby, a motor, a typewriting machine supported by said base or stand, a shaft mounted in the base or stand and adapted to be actuated by the motor, means operable at each revolution of the shaft for actuating the adding mechanism, means operable by the shaft for engaging the actuating devices of the numeral type of the typewriting machine, and a series of shifters corresponding in number to the numeral type of the typewriting machine and each adapted to effect an engagement of the motor and said shaft and cause the latter to actuate the numeral type of the typewriting machine associated with the operative shifter, said typewriting machine being removable from the stand or base independent of any adjustment of said shifters or parts controlled thereby.

5. In a combined typewriter and adder, the combination of a suitable base or stand, a typewriting machine on said base, an adding mechanism arranged on the base in front of and below the typewriting machine, and supported entirely independent of any part of the typewriting machine, a main shaft mounted in the base, a motor adapted to actuate said shaft, means adapted to be connected with and extending in opposite directions from said shaft and adapted respectively to operate the adding mechanism and the numeral type of the typewriting machine, and a series of shifters, corresponding to the numeral keys of the typewriting machine, arranged in the base or stand in front of the typewriting machine and each adapted to effect a connection of the motor with said main shaft and engagement between the latter and the means for actuating the adding mechanism and the numeral type associated with the operative shifter.

6. In a combined typewriter and adder, the combination with a suitable base or stand, a typewriting machine on said base, an adding mechanism independently supported on the base in front of and below the typewriting machine, a main shaft mounted in the base, a motor adapted to actuate said shaft, means for operating the adding mechanism, a series of levers 35 mounted on the base, means for transmitting movement from one arm of each of said levers to a numeral type of the typewriting machine, means for connecting the other arm of each said lever with the main shaft, and a series of shifters corresponding in number to the numeral keys of the typewriting machine and each adapted to effect a connection of the motor with said shaft and a connection of said shaft with both the lever 35, associated with the operative shifter and the means for operating the adding mechanism.

7. In a combined typewriter and adder, the combination of a suitable base or stand, a typewriting machine on said base, an adding mechanism independently supported on the base in front of and below the typewriting machine, a main shaft mounted in the base, a motor adapted to actuate said shaft, means for operating the adding mechanism, a series of levers 35 mounted on the base or stand, a second series of levers 37 mounted on said base and extending upwardly therefrom, each adapted to actuate a numeral type of the typewriting machine and being connected with one of said levers 35, means for connecting each of the last said levers with the main shaft, and a series of shifters corresponding to the numeral keys of the typewriting machine and each adapted to effect a connection of the motor with said shaft and the actuation by said shaft of the lever 35 associated with the operative shifter and the means for operating the adding mechanism.

8. In a combined typewriter and adder, the combination of a suitable base or stand, a typewriting machine on said base, an adding mechanism arranged on the base in front of and below the typewriting machine, a main shaft mounted in the base a motor adapted to actuate said shaft, means for operating the adding mechanism, a series of levers 35 mounted on the base, means for transmitting movement from each of said levers to a numeral type of the typewriting machine, a hook depending from each of said levers, a swinging bail adapted to be actuated at each rotation of the main shaft, and a series of shifters corresponding to the numeral keys of the typewriting machine and each adapted to effect a connection of the motor with said shaft and a shifting of the hook connected with the lever associated with the operative shifter into engagement with said bail.

9. In a combined typewriter and adder, the combination of a suitable base or stand, a typewriting machine on said base, an adding mechanism arranged on the base in front of and below the typewriting machine, a main shaft mounted in the base, a motor adapted to actuate said shaft, means for operating the adding mechanism, a series of levers 35 mounted on the base, means for transmitting movement from each of said levers to a numeral type of the typewriting machine, a link 32 depending from each of said levers, two swinging bails 30, 33 adapted to be actuated at each rotation of the main shaft, a series of shifters corresponding to the numeral keys of the typewriting machine and each adapted to effect a connection of the motor with said shaft, a reciprocating blade adjacent each shifter, a hook 28 pivotally mounted on each blade and adapted to be positioned by the coöperating shifter in the path of the bail 30, and means on each blade for shifting the adjacent link 32 into engagement with the bail 33.

10. In a combined typewriter and adder, the combination of a suitable base or stand, a typewriting machine on said base, an adding mechanism arranged on the base in front of and below the typewriting machine, a main shaft mounted in the base, a motor adapted to actuate said shaft, a pivotally mounted sector for operating the adding mechanism, a series of levers 35 mounted on the base, means for transmitting movement from each of said levers to a numeral type of the typewriting machine, a link 32 depending from each of said levers, two swinging bails 30, 33 adapted to be actuated at each rotation of the main shaft, a series of shifters corresponding to the numeral keys of the typewriting machine and each adapted to effect a connection of the motor with said shaft, a reciprocating blade adjacent each shifter, a hook 28 pivotally mounted on each blade and adapted to be positioned by the coöperating shifter and the path of the bail 30, means on each blade for effecting a connection between the link 32 and bail 33. and means on each blade for actuating said sector.

11. In a combined adder and typewriter, the combination of a base or stand, a typewriting machine mounted on the base, a carriage mounted on the base in front of and below the typewriting machine, connections between said front carriage and the platen carriage of the typewriting machine, an adder on the front carriage, a motor mechanism adapted to actuate both the adder and the numeral type of the typewriting machine and including a swinging bail 33, means for actuating the escapement mechanism of the typewriter carriage from said bail, and a series of shifters corresponding to the numeral keys of the typewriting carriage and adapted to control the action of said motor mechanism.

12. In a combined adder and typewriter, the combination of a base or stand, a typewriting machine mounted on the base, a carriage mounted on the base in front of and below the typewriting machine, connections between said front carriage and the platen carriage of the typewriting machine, an adder on the front carriage, a motor mechanism adapted to actuate both the adder and the numeral type of the typewriting machine and including a swinging bail 33, means for actuating the escapement mechanism of the typewriter carriage from said bail, including a reciprocating rod 49 extending from front to rear of the typewriting machine and adapted at each reciprocation to actuate said escapement mechanism, and a series of shifters corresponding to the numeral keys of the typewriting machine and adapted to control the action of said motor mechanism.

13. In a combined adder and typewriter, the combination of a base or stand, a typewriting machine mounted on said base, a carriage mounted on the base in front of the typewriting machine, an adder on said carriage, two winding drums mounted on the base, and tapes connecting said drums with both the platen carriage of the typewriting machine and the adder carriage, and arranged to cause said carriages to move together in the same direction throughout the movement of the platen carriage of the typewriting machine.

14. In a combined adder and typewriter, the combination of a base or stand, a typewriting machine mounted on said base, a carriage mounted on the base in front of the typewriting machine, an adder on said carriage, two drums mounted on the base, a spring motor connected with one of said drums, crossed tapes connecting said drums with opposite ends of the adder carriage, and supplemental tapes connecting said drums with the platen carriage of the typewriting machine.

15. In a combined adder and typewriter, the combination of a base or stand, a typewriting machine supported by said base, a second carriage supported by said base and having a "pitch" different from that of the carriage of the typewriting machine, and connection between said carriages whereby the second carriage is caused to have a uniform step by step movement in the same direction and throughout the length of the corresponding movement of the carriage of the typewriting machine.

16. In a combined adder and typewriter, the combination of a base or stand, a typewriting machine supported by said base, a second carriage supported by said base and having a "pitch" different from that of the carriage of the typewriting machine, two winding drums mounted on the base and each comprising two sections of different diameters, and tapes connecting said sections of each drum with the adder and typewriter carriages respectively to cause said carriages to move together in the same direction throughout the length of travel of the carriage of the typewriting machine.

17. In a combined adder and typewriter, the combination of a base or stand, a typewriting machine supported by said base, a second carriage supported by said base and having a "pitch" different from that of the carriage of the typewriting machine, two winding drums mounted on the base and each comprising two sections of different diameters, tapes connecting the smaller sections of said drums with opposite ends of the adder carriage, and other tapes connecting the larger sections of said drums with the typewriter carriage whereby said carriages are caused to move together in the same direction throughout the length of travel of the carriage of the typewriting machine.

18. In a combined adder and typewriter, the combination of a base or stand, a typewriting machine supported by said base, a second carriage supported by said base and having a "pitch" different from that of the carriage of the typewriting machine, means connecting said carriages, a spring drum connected with one of said carriages, escapement devices coöperating with the feed rack of the typewriting carriage and controlling the step by step movements of both said carriages.

19. In a combined adder and typewriter, the combination of a base or stand, a typewriting machine supported by said base, a second carriage supported by said base and having a "pitch" different from that of the carriage of the typewriting machine, means connecting said carriages, a spring drum connected with one of said carriages, escapement devices coöperating with the feed rack of the typewriting carriage and controlling the step by step movements of both said carriages, and an auxiliary detent 62$^a$ engaging said rack throughout such step by step movements.

20. In a combined adder and typewriter, the combination of a base or stand, a typewriting machine supported by said base, and including a carriage, an adder carriage supported by said base in front of the typewriting machine, means connecting said carriages, a spring drum adapted to move said carriages in one direction, escapement devices coöperating with the feed rack of the typewriting carriage to control the step by step movements of both of said carriages, and tabulating devices supported by said base or stand and adapted to retain said escapement devices and check the movement of both carriages by coöperating with the adder carriage.

21. In a combined adder and typewriter, the combination of a base or stand, a typewriting machine supported by said base, and including a carriage, an adder carriage supported by said base in front of the typewriting machine, means connecting said carriages, a spring drum adapted to move said carriages in one direction, escapement devices controlling the step by step movements of both carriages, and tabulating devices adapted to release the carriages from the control of said escapement devices and interpose any one of a plurality of stops in the path of movement of the adder carriage to limit the resulting movement of both carriages as desired.

22. In a combined adder and typewriter, the combination of a base or stand, a typewriting machine supported by said base, and including a carriage, an adder carriage supported by said base in front of the typewriting machine, means connecting said carriages, a spring drum adapted to move said carriages in one direction, escapement devices coöperating with the feed rack of the typewriting carriage to control the step by step movement of both said carriages, and tabulating devices supported by said base or stand in front of the adder carriage and comprising a plurality of stops each adapted to be projected into the path of movement of a stop connected with the adder carriage, and means whereby when any of said tabulator stops is rendered operative the said escapement devices are disengaged from the feed rack of the typewriting carriage.

In testimony whereof I affix my signature in presence of two witnesses.

JOHN NEWTON THORNTON.

Witnesses:
Wm. B. McNaughton,
Henry P. Boettcher.

Copies of this patent may be obtained for five cents each, by addressing the "Commissioner of Patents, Washington, D. C."